US011719829B2

(12) United States Patent
Cao et al.

(10) Patent No.: US 11,719,829 B2
(45) Date of Patent: Aug. 8, 2023

(54) ANTI-SPOOFING SATELLITE NAVIGATION AND POSITIONING METHOD AND CHIP

(71) Applicant: Hainan University, Haikou (CN)

(72) Inventors: Chunjie Cao, Haikou (CN); Yang Sun, Haikou (CN); Fangjian Tao, Haikou (CN); Xin Zheng, Haikou (CN); Xiuhua Wen, Haikou (CN)

(73) Assignee: Hainan University, Haikou (CN)

( * ) Notice: Subject to any disclaimer, the term of this patent is extended or adjusted under 35 U.S.C. 154(b) by 47 days.

(21) Appl. No.: 17/449,091

(22) Filed: Sep. 28, 2021

(65) Prior Publication Data

US 2022/0099842 A1 Mar. 31, 2022

(30) Foreign Application Priority Data

Sep. 29, 2020 (CN) ........................ 202011050377.X

(51) Int. Cl.

| | |
|---|---|
| ***G01S 19/02*** | (2010.01) |
| ***G01S 19/03*** | (2010.01) |
| ***G01S 19/39*** | (2010.01) |
| ***G01S 19/23*** | (2010.01) |
| ***G01S 19/48*** | (2010.01) |

(52) U.S. Cl.
CPC ............ *G01S 19/396* (2019.08); *G01S 19/02* (2013.01); *G01S 19/23* (2013.01); *G01S 19/48* (2013.01)

(58) Field of Classification Search
CPC ........ G01S 19/396; G01S 19/02; G01S 19/23; G01S 19/48
USPC .......................................................... 342/352
See application file for complete search history.

(56) References Cited

U.S. PATENT DOCUMENTS 11,480,689 B2 * 10/2022 Schwindt .............. G01S 19/215

* cited by examiner

*Primary Examiner* — Harry K Liu
(74) *Attorney, Agent, or Firm* — Bayramoglu Law Offices LLC

(57) ABSTRACT

An anti-spoofing satellite navigation and positioning method includes: receiving a positioning satellite radio frequency (RF) signal by a satellite RF receiving module, and detecting whether a power strength of the received signal exceeds a preset threshold; preprocessing the received signal by a satellite RF signal identification module, and intercepting an identifiable positioning satellite signal for identification to distinguish a real signal and a false signal; calculating the received signal to acquire real position and time information when the received signal is identified as the real signal; and sending an alarm message when the received signal is identified as the false signal. An anti-spoofing satellite navigation and positioning chip is further provided. By identifying whether the signal is a real signal or a false signal, the authenticity of the upper-layer position calculation is ensured, and the purpose of timely and accurate detection and effective resistance to spoofing attacks is achieved.

8 Claims, 3 Drawing Sheets

Receive a positioning satellite radio frequency (RF) signal by a satellite RF receiving module, and detect whether a power strength of the received signal exceeds a preset threshold — S1

Preprocess the received signal by a satellite RF signal identification module, and intercept an identifiable positioning satellite signal for identification to distinguish a real signal and a false signal — S2

Calculate the received signal to acquire real position and time information when the received signal is identified as the real signal; and send an alarm message when the received signal is identified as the false signal — S3

ANTI-SPOOFING SATELLITE NAVIGATION AND POSITIONING METHOD AND CHIP

CROSS REFERENCE TO THE RELATED APPLICATIONS

This application is based upon and claims priority to Chinese Patent Applications No. 202011050377.X, filed on Sep. 29, 2020, the entire contents of which are incorporated herein by reference.

TECHNICAL FIELD

The present invention relates to the technical field of satellite positioning, and more particularly, to an anti-spoofing satellite navigation and positioning method and chip.

BACKGROUND

The prior navigation and positioning chip captures and tracks satellite signals to calculate position information. The built-in security alarm function of the chip determines whether the chip is subjected to a spoofing attack by determining whether the change of the position information exceeds preset longitude and latitude thresholds. The prior navigation and positioning chip has the following shortcomings. 1. The chip has a high rate of misjudgment in an environment with weak satellite signals. The chip determines whether a spoofing attack occurs only based on the calculated position information, to be specific, after calculating the position information, the chip determines whether a spoofing attack occurs only by using the calculated result in combination with the thresholds. When the chip is in a complex environment such as one with weak satellite signals, the chip itself is prone to positioning errors, which may cause the determination errors of the chip. 2. The setting of the thresholds is complex, which affects the determination accuracy of the chip for the spoofing attack. The chip determines whether a spoofing attack occurs only based on the calculated position information by setting the thresholds of change of the compared position. However, the setting of the latitude and longitude thresholds preset in the chip varies according to the positioning accuracy in different environments and the different movement states of the carrier, which greatly reduces the determination accuracy of the chip. 3. The chip can detect but cannot resist a spoofing attack. The chip determines whether a spoofing attack occurs only after it calculates the position. That is, when the chip detects a spoofing attack, it already completes position calculation. Therefore, the chip cannot filter out the influence of the spoofing attack signal or provide the real position of the carrier, thereby failing to resist the spoofing attack.

SUMMARY

An objective of the present invention is to provide an anti-spoofing satellite navigation and positioning method and chip. The present invention ensures that the satellite navigation and positioning chip has the ability to effectively detect and resist spoofing attacks under various complex environments and different movement states of a carrier.

A first part of the present invention provides an anti-spoofing satellite navigation and positioning method. The method includes:

receiving a positioning satellite radio frequency (RF) signal by a satellite RF receiving module, and detecting whether a power strength of the received signal exceeds a preset threshold;

preprocessing the received signal by a satellite RF signal identification module, and intercepting an identifiable positioning satellite signal for identification to distinguish a real signal and a false signal; and calculating the received signal to acquire real position and time information when the received signal is identified as the real signal; and sending an alarm message when the received signal is identified as the false signal.

Further, before the step of receiving the positioning satellite signal by the satellite RF receiving module, the method may include:

activating a control decision-making unit to perform a first self-test to determine whether firmware needs to be updated; and performing a second self-test by the control decision-making unit to determine whether a signal identification function is normal.

Further, the step of activating the control decision-making unit to perform the first self-test to determine whether the firmware needs to be updated may include:

sending, by the control decision-making unit, an update instruction to a firmware update unit, and sending, by the firmware update unit, a firmware update request to a ground master station after receiving the update instruction; and updating, by the firmware update unit, the firmware according to a request processing result of the ground master station, and feeding back a firmware update result to the control decision-making unit.

Further, the step of performing the second self-test by the control decision-making unit to determine whether the signal identification function is normal may include:

sending, by the control decision-making unit, a security self-test instruction to a random false signal generator;

randomly selecting, by the random false signal generator, parameters of a plurality of satellites after receiving the instruction to generate false signals; and identifying the false signals, sending an identification result to a security decision-making unit, and sending, by the security decision-making unit, a corresponding instruction to a security alarm unit according to the identification result.

Further, the step of preprocessing the received signal, and intercepting the identifiable positioning satellite signal for identification to distinguish the real signal and the false signal may include:

preprocessing the received signal, and detecting and intercepting the identifiable satellite signal after preprocessing;

converting the intercepted satellite signal into information allowable to be subjected to extraction of an RF fingerprint feature, and extracting corresponding RF fingerprint information; and acquiring a real satellite signal fingerprint in a satellite RF signal fingerprint library, comparing the real satellite signal fingerprint with the RF fingerprint information to be identified, and determining whether the satellite signal corresponding to the RF fingerprint information is the real signal or the false signal according to a comparison result.

A second part of the present invention provides an anti-spoofing satellite navigation and positioning chip. The chip includes:

a satellite RF receiving module, configured to receive a positioning satellite signal, and detect whether a power strength of the received signal exceeds a preset threshold;

a satellite RF signal identification module, configured to preprocess the received signal, and intercept an identifiable positioning satellite signal for identification to distinguish a real signal and a false signal;

a position and time calculation module, configured to calculate the received signal to acquire real position and time information when the received signal is identified as the real signal by the satellite RF signal identification module; and a security control module, configured to send an alarm message when the received signal is identified as the false signal by the satellite RF signal identification module.

Further, the security control module may include a control decision-making unit, configured to perform a first self-test when activated to determine whether firmware needs to be updated, and perform a second self-test to determine whether the satellite RF signal identification module is operating normally.

Further, the security control module may include a firmware update unit; and the firmware update unit may be configured to receive an update instruction sent by the control decision-making unit, send a firmware update request to a ground master station according to the update instruction, update the firmware according to a request processing result of the ground master station, and feed back a firmware update result to the control decision-making unit.

Further, the chip may include a random false signal generator; the random false signal generator may be configured to receive a security self-test instruction sent by the control decision-making unit, select parameters of a plurality of satellites after receiving the instruction to generate false signals, send the false signals to the satellite RF signal identification module for identification, and send an identification result to a security decision-making unit; and the security decision-making unit may send a corresponding instruction to a security alarm unit according to the identification result.

Further, the satellite RF signal identification module may include:

a satellite signal preprocessing unit, configured to preprocess the received signal;

a satellite signal interval interception unit, configured to detect the preprocessed satellite signal and intercept the identifiable satellite signal;

a satellite RF fingerprint conversion unit, configured to convert the intercepted satellite signal into information allowable to be subjected to extraction of an RF fingerprint feature, and extract corresponding RF fingerprint information; and an identification unit, configured to acquire a real satellite signal fingerprint in a satellite RF signal fingerprint library, compare the real satellite signal fingerprint with the RF fingerprint information to be identified, and determine whether the satellite signal corresponding to the RF fingerprint information is the real signal or the false signal according to a comparison result.

Compared with the prior art, the present invention has the following beneficial effects:

The present invention prevents a high-power signal from burning a circuit by detecting whether the power strength of the received signal exceeds a preset threshold. The present invention realizes timely and accurate identification and separation of real and false signals through the satellite RF signal identification module. By identifying whether the signal is a real signal or a false signal, the present invention ensures authenticity of the upper-layer position calculation, and achieves the purpose of timely and accurate detection and effective resistance to spoofing attacks.

BRIEF DESCRIPTION OF THE DRAWINGS

In order to describe the technical solutions in the embodiments of the present invention more clearly, the drawings required to describe the embodiments are briefly described below. Apparently, the drawings described below are only preferred embodiments of the present invention. Those of ordinary skill in the art may further obtain other drawings based on these drawings without creative efforts.

DETAILED DESCRIPTION OF THE EMBODIMENTS

The principles and features of the present invention are described below with reference to the drawings. The listed embodiments only serve to explain the present invention, rather than to limit the scope of the present invention.

Figure 1:
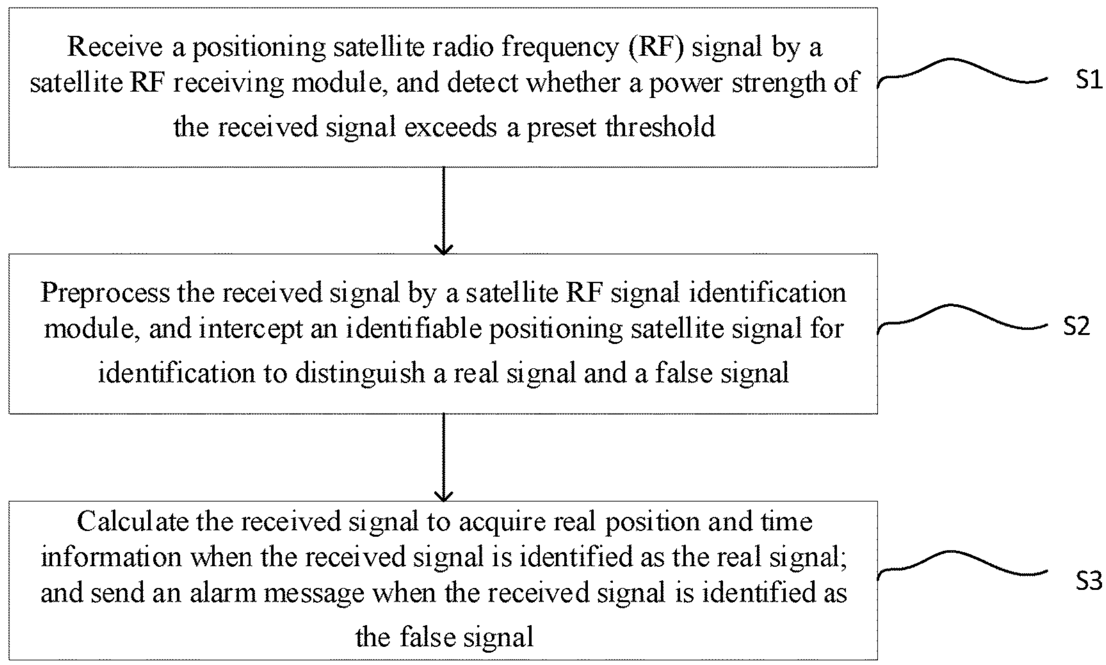
FIG. 1 is a flowchart of an anti-spoofing satellite navigation and positioning method according to an embodiment of the present invention.

Referring to FIG. 1, the present invention provides an anti-spoofing satellite navigation and positioning method. The method includes the following steps:

S1. Receive a positioning satellite radio frequency (RF) signal by a satellite RF receiving module, and detect whether a power strength of the received signal exceeds a preset threshold.

S2. Preprocess the received signal by a satellite RF signal identification module, and intercept an identifiable positioning satellite signal for identification to distinguish a real signal and a false signal.

S3. Calculate the received signal to acquire real position and time information when the received signal is identified as the real signal; and send an alarm message when the received signal is identified as the false signal.

Figure 2:
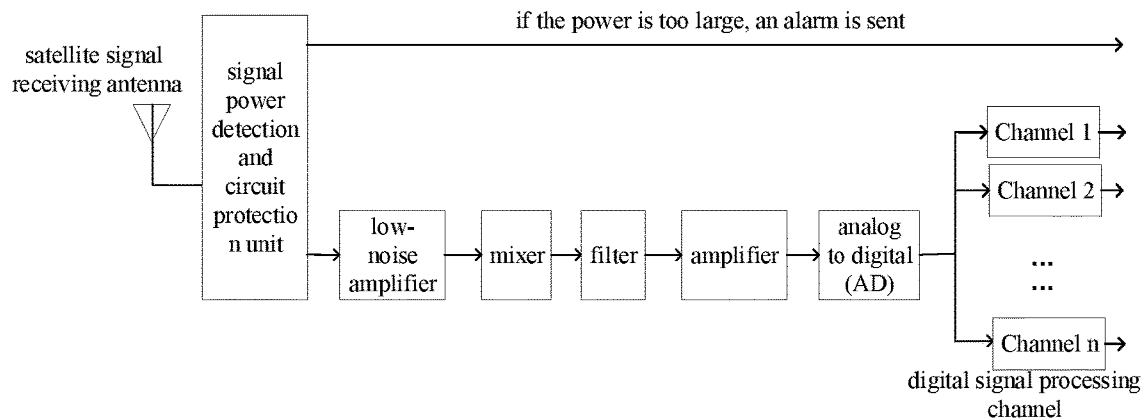
FIG. 2 is a view illustrating a working principle of a satellite radio frequency (RF) receiving module according to an embodiment of the present invention.

As shown in FIG. 2, the satellite RF receiving module is composed of a satellite signal receiving antenna, a signal power detection and circuit protection unit, a low-noise amplifier, a mixer, a filter, an amplifier, an analog to digital (AD) converter and a digital signal processing channel. After the satellite signal receiving antenna receives a positioning satellite RF signal, the signal power detection and circuit protection unit detects whether the power strength of the received signal exceeds the preset threshold, and if the power is too large, an alarm is sent. If the power is normal, the satellite signal is transmitted to the low-noise amplifier to amplify the weak signal of the satellite signal receiving antenna while ensuring low noise of the signal. The mixer then mixes the amplified low-noise signal with a local precision clock so as to mix the satellite signal to a lower frequency. The filter removes a noise signal outside a signal band. The AD converter quantizes a useful signal into a digital signal and sends the digital signal to the digital signal processing channel. The digital signal processing channel transmits n satellites signals to the satellite RF signal identification module through n parallel channels.

The signal power detection and circuit protection unit includes an original signal receiving unit, a power overload monitoring unit, a circuit control unit and a signal path control unit. The original signal receiving unit receives a signal from the satellite signal receiving antenna, detects a frequency range of the signal, and transmits the signal to the power overload monitoring unit to determine whether the signal power is excessive. The power overload monitoring unit may be implemented by diode detection, logarithmic detection, root mean square detection or other method. The circuit protection control unit acquires a power detection result, and according to the power detection result, determines whether to continue to receive a signal or alarm. The signal path control unit receives an instruction of the circuit protection control unit, and determines whether the received signal is to be processed in a next step.

As an example, before the step of receiving the positioning satellite signal by the satellite RF receiving module, the method includes:

Activate a control decision-making unit to perform a first self-test to determine whether firmware needs to be updated.

Perform a second self-test by the control decision-making unit to determine whether a signal identification function is normal.

The step of activating the control decision-making unit to perform the first self-test to determine whether the firmware needs to be updated includes:

Send, by the control decision-making unit, an update instruction to a firmware update unit, and send, by the firmware update unit, a firmware update request to a ground master station after receiving the update instruction.

Update, by the firmware update unit, the firmware according to a request processing result of the ground master station, and feed back a firmware update result to the control decision-making unit. If there is no firmware update, the firmware update unit sends a “no update” feedback to the control decision-making unit, and the control decision-making unit performs the next self-test. If there is firmware update, the firmware update unit sends an “update in progress” feedback to the control decision-making unit, the control decision-making unit starts to wait, and the firmware update unit downloads data to perform the firmware update. After the update is completed, the firmware update unit sends an “update completed” feedback to the control decision-making unit, and the control decision-making unit starts the next self-test.

The step of performing the second self-test by the control decision-making unit to determine whether the signal identification function is normal includes:

Send, by the control decision-making unit, a security self-test instruction to a random false signal generator.

Randomly select, by the random false signal generator, parameters of a plurality of satellites after receiving the instruction, and generate false signals.

Identify the false signals, send an identification result to a security decision-making unit, and send, by the security decision-making unit, a corresponding instruction to a security alarm unit according to the identification result.

The random false signal generator imitates a satellite to generate a false satellite navigation and positioning signal. The false signal is generated strictly in accordance with published specifications for satellite navigation and positioning signals, ensuring that the generated false signal can be captured and tracked by a common positioning receiver.

Figure 3:
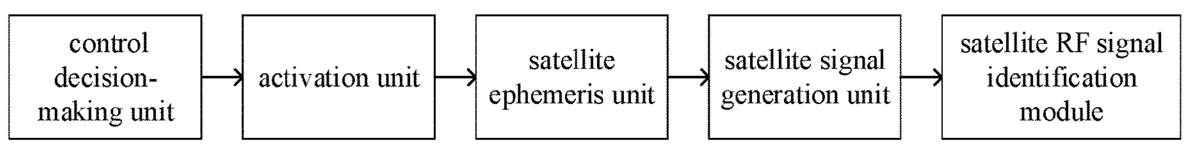
FIG. 3 is a view illustrating a working principle of a random false signal generator according to an embodiment of the present invention.

As shown in FIG. 3, the random false signal generator includes an activation unit, a satellite ephemeris unit and a satellite signal generation unit. The activation unit receives an instruction of the control decision-making unit to activate the entire module to start working. The satellite ephemeris unit includes ephemeris parameters of various satellites, and it randomly selects parameters of a plurality of satellites after receiving an instruction of the activation unit. The satellite signal generation unit generates various satellite signals according to the satellite signal standards based on received satellite ephemeris parameters, and transmits the signals to the satellite RF signal identification module for identification. This module is used in an early power-on self-test stage of the security chip, mainly to provide a simulated attack scenario for detecting whether the function of the satellite RF signal identification module is normal.

As an example, in step S2, the step of preprocessing the received signal, and intercepting the identifiable positioning satellite signal for identification to distinguish the real signal and the false signal includes:

Preprocess the received signal, and detect and intercept the identifiable satellite signal after preprocessing.

Convert the intercepted satellite signal into information allowable to be subjected to extraction of an RF fingerprint feature, and extract corresponding RF fingerprint information.

Acquire a real satellite signal fingerprint in a satellite RF signal fingerprint library, compare the real satellite signal fingerprint with the RF fingerprint information to be identified, and determine whether the satellite signal corresponding to the RF fingerprint information is the real signal or the false signal according to a comparison result.

Figure 4:
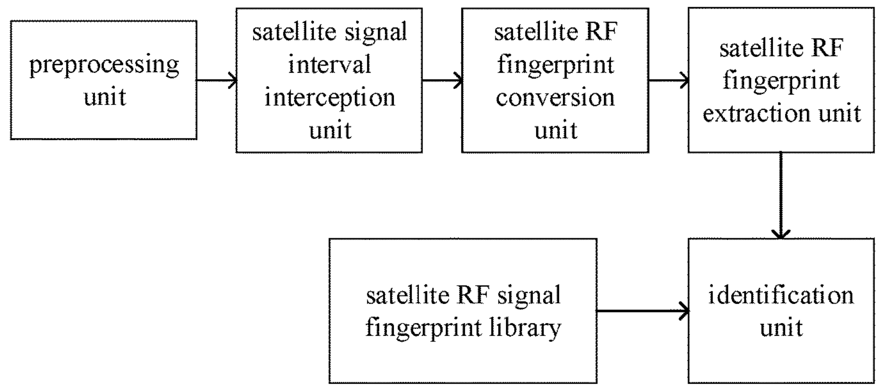
FIG. 4 is a view illustrating a working principle of a satellite RF signal identification module according to an embodiment of the present invention.

The satellite RF receiving module may receive real and false signals during normal operation. As shown in FIG. 4, after the satellite RF signal identification module receives the satellite signals through various channels, a preprocessing unit performs preprocessing operations such as phase compensation and energy normalization on the signals of various channels. After preprocessing, a satellite signal interval interception unit detects identifiable satellite signals, intercepts identifiable satellite signals of various channels, and provides the identifiable signals to a satellite RF fingerprint conversion unit. The satellite RF fingerprint conversion unit converts the satellite signals into information allowable to be subjected to extraction of an RF fingerprint feature by converting the signals into a time domain, a frequency domain or a wavelet domain. A satellite RF fingerprint extraction unit extracts relevant features of satellite signal transmitters of various channels. The signal of each channel constitutes a feature vector as an RF fingerprint of the satellite signal of the channel. An identification unit is based on a real satellite signal fingerprint provided by a satellite RF signal fingerprint library to compare the RF fingerprint of the satellite signal to be identified in each channel with the RF fingerprint of a satellite number claimed by the satellite signal of each channel, so as to distinguish a real signal from a false spoofing signal. The comparison may be implemented by a support vector machine (SVM) algorithm, or by other algorithm.

Figure 5:
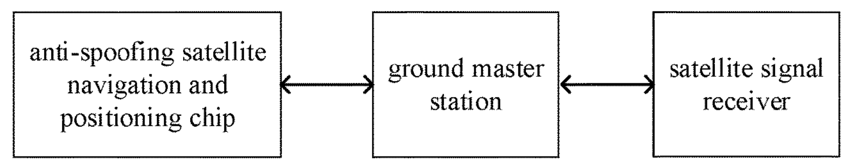
FIG. 5 is a view illustrating a principle of updating a satellite RF fingerprint according to an embodiment of the present invention.

As shown in FIG. 5, the update of the real satellite signal fingerprint is achieved through the firmware update of the power-on self-test. The ground master station acquires the latest satellite signals through a satellite signal receiver, and acquires the latest RF fingerprint features of each satellite signal. The chip updates the firmware in time during the first self-test to acquire the latest satellite RF fingerprint features.

Figure 6:
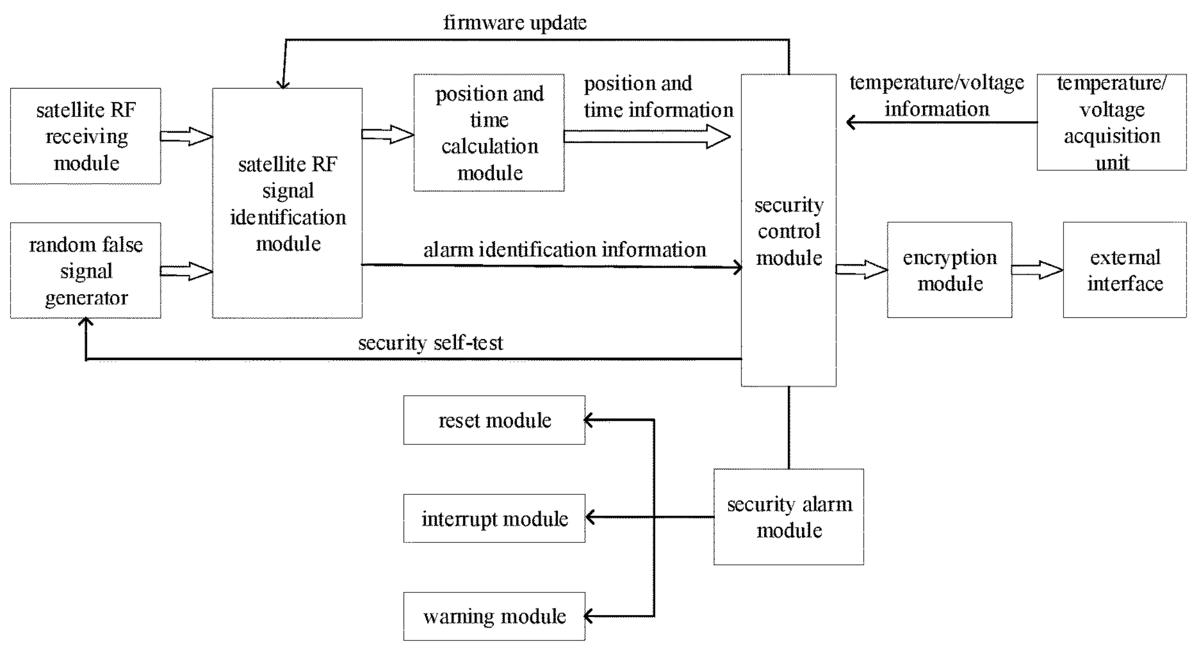
FIG. 6 is a view illustrating a working principle of an anti-spoofing satellite navigation and positioning chip according to an embodiment of the present invention.
Figure 7:
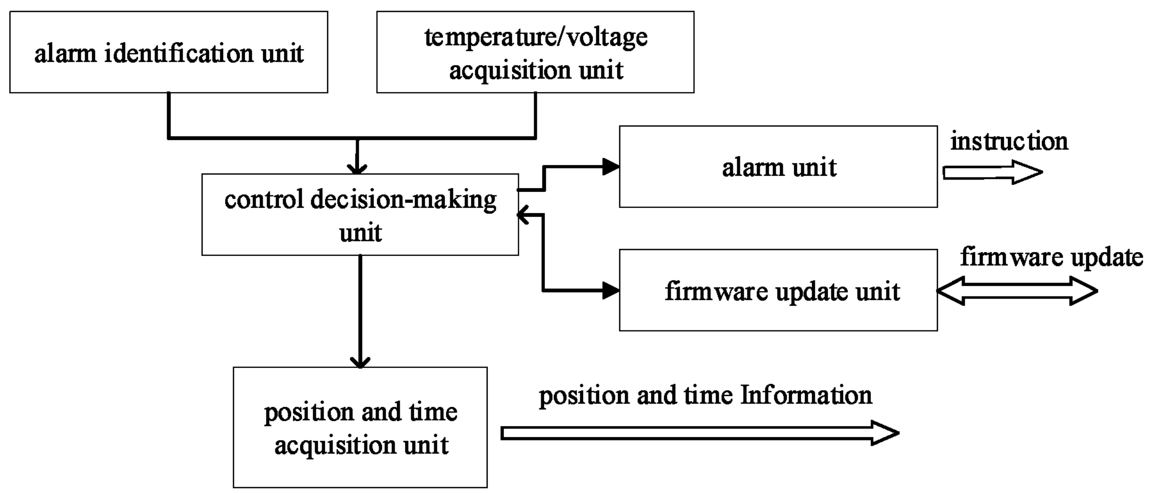
FIG. 7 is a view illustrating a structure of a security control module according to an embodiment of the present invention.

Based on the same inventive concept, another embodiment of the present invention provides an anti-spoofing satellite navigation and positioning chip. As shown in FIGS. 6 and 7, the chip includes:

a satellite RF receiving module, configured to receive a positioning satellite signal, and detect whether a power strength of the received signal exceeds a preset threshold;

a satellite RF signal identification module, configured to preprocess the received signal, and intercept an identifiable positioning satellite signal for identification to distinguish a real signal and a false signal;

a position and time calculation module, configured to calculate the received signal to acquire real position and time information when the received signal is identified as the real signal by the satellite RF signal identification module; and a security control module, configured to send an alarm message when the received signal is identified as the false signal by the satellite RF signal identification module.

Specifically, the security control module includes an alarm identification unit, a control decision-making unit, a position and time acquisition unit, a temperature/voltage acquisition unit, an alarm unit and a firmware update unit. After the chip is powered on, the control decision-making unit is activated to complete two steps of power-on self-tests. A first step is to notify the firmware update unit to check whether there is an update, the firmware update unit checks whether there is an update through a server, and sends identification information to the control decision-making unit: "no update", "update in progress", and "update completed". The firmware update is performed by the firmware update unit directly communicating with the satellite RF signal identification module. When the control decision-making unit receives "no update" or "update completed" information, it starts a second step of self-test. The control decision-making unit notifies a random false signal generator to send false signals, so as to detect whether the satellite RF signal identification module is operating normally. The temperature/voltage acquisition unit acquires a physical state of the chip, and combines information acquired by the alarm identification unit to determine whether the function and physical state of the chip are normal, and transmits a result to the security alarm module through the alarm unit. The security alarm module takes a corresponding measure based on the information. After the power-on self-tests are passed, the control decision-making unit sends an instruction to receive position and time information to the position and time acquisition unit, and the chip starts to work normally. Throughout the working process, the control decision-making unit always monitors the information of the alarm identification unit and the temperature/voltage acquisition unit, so as to responds in time to a spoofing attack and an abnormal physical state.

The security alarm module provides a reset function, an interrupt function and a warning function by receiving instructions from the security control module, which are implemented by a reset module, an interrupt module and a warning module respectively, and identified by "0", "1" and "2" respectively. The activation conditions of the three functions are described as follows. Reset function: There is no fault in the power-on self-tests, and the chip is ready to reset. Interrupt function: The interrupt function is enabled to stop the chip from working when the power-on self-tests fail and the chip cannot work or a high-power interference signals that may cause damage to a chip circuit is found during work. Warning function: When a spoofing signal is found during work, the chip can still work normally, but a warning message is sent to remind that the carrier is under attack. The activation of the three functions is achieved through the instructions of the security control module.

The chip further includes the random false signal generator. The random false signal generator is configured to receive a security self-test instruction sent by the control decision-making unit, select parameters of a plurality of satellites after receiving the instruction to generate false signals, send the false signals to the satellite RF signal identification module for identification, and send an identification result to a security decision-making unit. The security decision-making unit sends a corresponding instruction to the security alarm unit according to the identification result.

The satellite RF signal identification module includes:

a satellite signal preprocessing unit, configured to preprocess the received signal;

a satellite signal interval interception unit, configured to detect the preprocessed satellite signal and intercept the identifiable satellite signal;

a satellite RF fingerprint conversion unit, configured to convert the intercepted satellite signal into information allowable to be subjected to extraction of an RF fingerprint feature, and extract corresponding RF fingerprint information; and an identification unit, configured to acquire a real satellite signal fingerprint in a satellite RF signal fingerprint library, compare the real satellite signal fingerprint with the RF fingerprint information to be identified, and determine whether the satellite signal corresponding to the RF fingerprint information is the real signal or the false signal according to a comparison result.

The device embodiment is used to implement the method embodiment, and the principles and beneficial effects of the device embodiment may be referred to the method embodiment, which will not be repeated herein.

The above described are merely preferred embodiments of the present invention, which are not intended to limit the present invention. Any modifications, equivalent replacements and improvements made within the spirit and principle of the present invention should be included in the protection scope of the present invention.

What is claimed is:

1. An anti-spoofing satellite navigation and positioning method, applied to a chip, comprising the following steps:

activating a control decision-making unit to perform a first self-test to determine whether firmware needs to be updated; and performing a second self-test by the control decision-making unit to determine whether a signal identification function is normal;

receiving a positioning satellite radio frequency (RF) signal by a satellite RF receiving module to obtain a received signal, and detecting whether a power strength of the received signal exceeds a preset threshold;

preprocessing the received signal by a satellite RF signal identification module, and intercepting an identifiable positioning satellite signal for identification to distinguish a real signal and a false signal; and calculating the received signal to acquire real position and time information when the received signal is identified as the real signal; and sending an alarm message when the received signal is identified as the false signal.

2. The anti-spoofing satellite navigation and positioning method according to claim 1, wherein the step of activating the control decision-making unit to perform the first self-test to determine whether the firmware needs to be updated comprises:

sending, by the control decision-making unit, an update instruction to a firmware update unit, and sending, by the firmware update unit, a firmware update request to a ground master station after receiving the update instruction; and updating, by the firmware update unit, the firmware according to a request processing result of the ground master station, and feeding back a firmware update result to the control decision-making unit.

3. The anti-spoofing satellite navigation and positioning method according to claim 1, wherein the step of performing the second self-test by the control decision-making unit to determine whether the signal identification function is normal comprises:

sending, by the control decision-making unit, a security self-test instruction to a random false signal generator;

randomly selecting, by the random false signal generator, parameters of a plurality of satellites after receiving the security self-test instruction to generate false signals; and identifying the false signals to obtain an identification result, sending the identification result to a security decision-making unit, and sending, by the security decision-making unit, a corresponding instruction to a security alarm unit according to the identification result.

4. The anti-spoofing satellite navigation and positioning method according to claim 1, wherein the step of preprocessing the received signal, and intercepting the identifiable positioning satellite signal for identification to distinguish the real signal and the false signal comprises:

preprocessing the received signal, and detecting and intercepting the identifiable positioning satellite signal after preprocessing;

converting the identifiable positioning satellite signal into information allowable to be subjected to extraction of an RF fingerprint feature, and extracting RF fingerprint information corresponding to the identifiable positioning satellite signal; and acquiring a real satellite signal fingerprint in a satellite RF signal fingerprint library, comparing the real satellite signal fingerprint with the RF fingerprint information to be identified to obtain a comparison result, and determining whether the identifiable positioning satellite signal corresponding to the RF fingerprint information is the real signal or the false signal according to the comparison result.

5. An anti-spoofing satellite navigation and positioning chip, comprising:

a satellite radio frequency (RF) receiving module, configured to receive a positioning satellite signal to obtain a received signal, and detect whether a power strength of the received signal exceeds a preset threshold;

a satellite RF signal identification module, configured to preprocess the received signal, and intercept an identifiable positioning satellite signal for identification to distinguish a real signal and a false signal;

a position and time calculation module, configured to calculate the received signal to acquire real position and time information when the received signal is identified as the real signal by the satellite RF signal identification module; and a security control module, configured to send an alarm message when the received signal is identified as the false signal by the satellite RF signal identification module, and the security control module further comprises a control decision-making unit, wherein the control decision-making unit is configured to perform a first self-test when activated to determine whether firmware needs to be updated, and perform a second self-test to determine whether the satellite RF signal identification module is operating normally.

6. The anti-spoofing satellite navigation and positioning chip according to claim 5, wherein the security control module further comprises a firmware update unit; and the firmware update unit is configured to receive an update instruction sent by the control decision-making unit, send a firmware update request to a ground master station according to the update instruction, update the firmware according to a request processing result of the ground master station, and feed back a firmware update result to the control decision-making unit.

7. The anti-spoofing satellite navigation and positioning chip according to claim 5, further comprising a random false signal generator, wherein the random false signal generator is configured to receive a security self-test instruction sent by the control decision-making unit, select parameters of a plurality of satellites after receiving the security self-test instruction to generate false signals, send the false signals to the satellite RF signal identification module for identification to obtain an identification result, and send the identification result to a security decision-making unit; and the security decision-making unit sends a corresponding instruction to a security alarm unit according to the identification result.

8. The anti-spoofing satellite navigation and positioning chip according to claim 5, wherein the satellite RF signal identification module comprises:

a satellite signal preprocessing unit, configured to preprocess the received signal to obtain a preprocessed satellite signal;

a satellite signal interval interception unit, configured to detect the preprocessed satellite signal and intercept the identifiable positioning satellite signal;

a satellite RF fingerprint conversion unit, configured to convert the identifiable positioning satellite signal into information allowable to be subjected to extraction of an RF fingerprint feature, and extract RF fingerprint information corresponding to the identifiable positioning satellite signal; and an identification unit, configured to acquire a real satellite signal fingerprint in a satellite RF signal fingerprint library, compare the real satellite signal fingerprint with the RF fingerprint information to be identified to obtain a comparison result, and determine whether the identifiable positioning satellite signal corresponding to the RF fingerprint information is the real signal or the false signal according to the comparison result.

* * * * *